(12) United States Patent
Lambiaso

(10) Patent No.: US 6,619,588 B2
(45) Date of Patent: Sep. 16, 2003

(54) INSTALLATION OF SINGLE PASSENGER INTERFACE UNIT AND METHOD THEREOF

(75) Inventor: Guy Lambiaso, Garden Grove, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/047,746

(22) Filed: Jan. 14, 2002

(65) Prior Publication Data

US 2003/0132346 A1 Jul. 17, 2003

(51) Int. Cl.[7] .............................................. B64D 11/00
(52) U.S. Cl. .................. 244/118.5; 244/118.6; 297/217.3
(58) Field of Search ........................... 244/118.5, 118.6, 244/137.2; 105/345; 297/217.3

(56) References Cited

U.S. PATENT DOCUMENTS

| 4,428,078 | A | * | 1/1984 | Kuo ............................. 381/79 |
| 4,763,360 | A | * | 8/1988 | Daniels et al. ......... 340/310.08 |
| 5,409,186 | A | * | 4/1995 | Chow ........................... 165/41 |
| 5,945,631 | A | * | 8/1999 | Henrikson et al. ...... 174/102 R |
| 6,179,381 | B1 | * | 1/2001 | Gevaert .................... 297/217.3 |
| 6,194,853 | B1 | * | 2/2001 | Tual et al. ................ 244/118.6 |
| 6,249,913 | B1 | * | 6/2001 | Galipeau et al. ............ 700/295 |
| 6,260,813 | B1 | * | 7/2001 | Whitcomb ............... 244/118.6 |

* cited by examiner

Primary Examiner—Michael J. Carone
Assistant Examiner—Gabriel S. Sukman
(74) Attorney, Agent, or Firm—Harness Dickey & Pierce P.L.C.

(57) ABSTRACT

A passenger interface unit as provided that is positioned on a floor portion of an aircraft and attaches to a seat track on the aircraft floor portion. The passenger interface unit can be reattached to different locations long the seat track throughout the aircraft.

8 Claims, 4 Drawing Sheets

INSTALLATION OF SINGLE PASSENGER INTERFACE UNIT AND METHOD THEREOF

FIELD OF THE INVENTION

The present invention relates generally to the installation of single passenger interface unit on the floor area of an aircraft, and more particularly, to the installation of a single passenger interface unit on the floor area of an aircraft that is able to be easily relocated to a.different area inside the aircraft.

BACKGROUND OF THE INVENTION

With the advent of the telecommunications and the computer age, individuals are constantly in need of electronic contact with external sources such as telecommunications networks and the internet. This direction is exemplified by the increase and advancement in wireless technology including cell phones, wireless LANs and wireless modems. Such wireless technology allows individuals to communicate with other individuals and connect to computer networks and the internet from remote areas such as inside automobiles, camp sites, and vacation resorts. As a result, individuals are able to perform their jobs and maintain communication while traveling and at locations far outside the office, thereby transforming the traditional brick and mortar office environment into a virtual office space.

While wireless technology is heavily used in land based locations such as land vehicles, it has not as-of-yet found widespread use in certain types of transportation. Specifically, the use of wireless technology on aircrafts has not been penetrated due to the great distance between the remote computer or cellular device and the cellular hub as well as the restrictions placed upon passengers due to potential interference of the transmitting cellular device with the aircraft's navigation, systems. To overcome this, some aircraft manufacturers have provided a single wireless link to allow passengers in the aircraft to connect to a ground based cellular link.for connection to a cellular or computer network. While this technological advancement serves to provide adequate transmission power to reach ground based connections and does not interfere with the aircraft's navigational systems, the logistics of properly connecting to a passenger's individual computer still remains to be achieved and refined.

Specifically, network servers or passenger interface units are required to be installed in the aircraft. Each passenger interface unit provides connections for multiple computer users to connect. The passenger interface unit, in turn, communicates with a transmitter/receiver external to the aircraft for transmitting information to and from a ground based link. The passenger interface unit, which is bulky and fragile, must be mounted in a location out of sight and hindrance from the aircraft passengers. Typically, this location is in the side walls of the aircraft. The.passenger interface unit is placed through a hole in the side wall and mounted to the frame of the aircraft. The hole is then sealed back up while allowing for a small aperture to pass communications cable to each of a plurality of passenger seats. While this mounting method does serve to adequately mount the passenger interface unit, some drawbacks exist. Specifically, this mounting method requires the presence of large apertures for communication cable to pass through, resulting in an aesthetically unpleasing surface. Moreover, after the passenger interface unit is removed, there remains a hole which must somehow be re-sealed. The present invention was developed in light of these and other drawbacks.

SUMMARY OF THE INVENTION

To overcome these and other drawbacks, the present invention provides a passenger interface unit that includes a server having an attachment means for attaching to a seat track in an aircraft. In another aspect an aircraft is provided having a passenger interface unit and a seat track. The passenger interface unit includes a server mounted to a support plate, where the support plate includes a pair of ears. The ears are attached to the seat track. Cables run from the server, along an area between the seat track and a seat.track cover until each respective cable terminates at a respective seat. Accordingly, the server provides independent computer connections to each respective seat in a block of seats. In another aspect, a plurality of passenger interface units is provided such that most or all of the seats throughout the aircraft are provided with computer connection.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and he accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
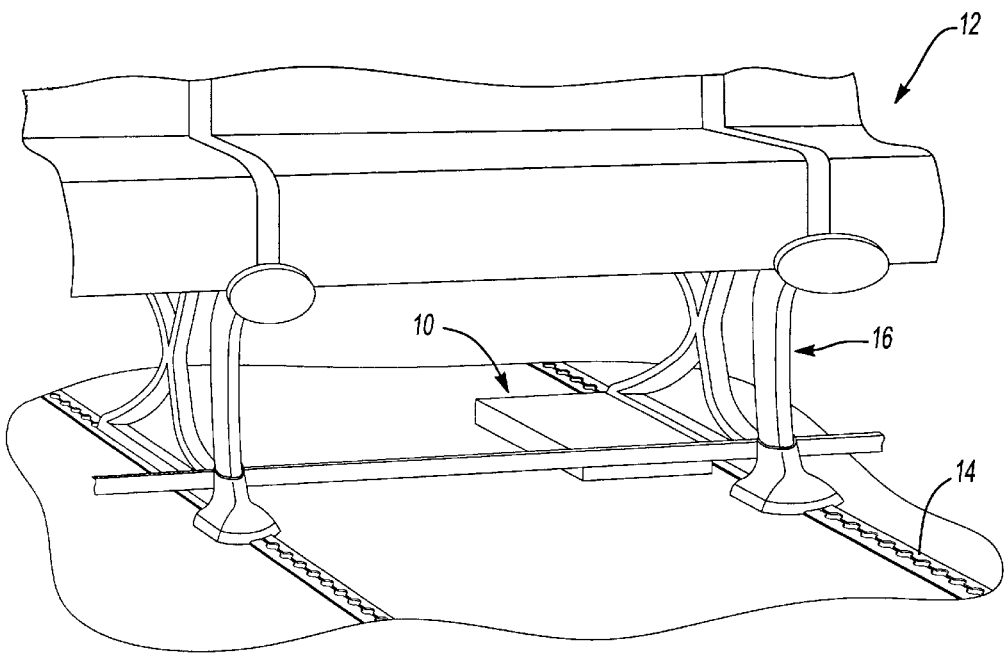
FIG. 1 is a perspective view of a passenger interface unit mounted to a floor of an aircraft according to the present invention.
Figure 2:
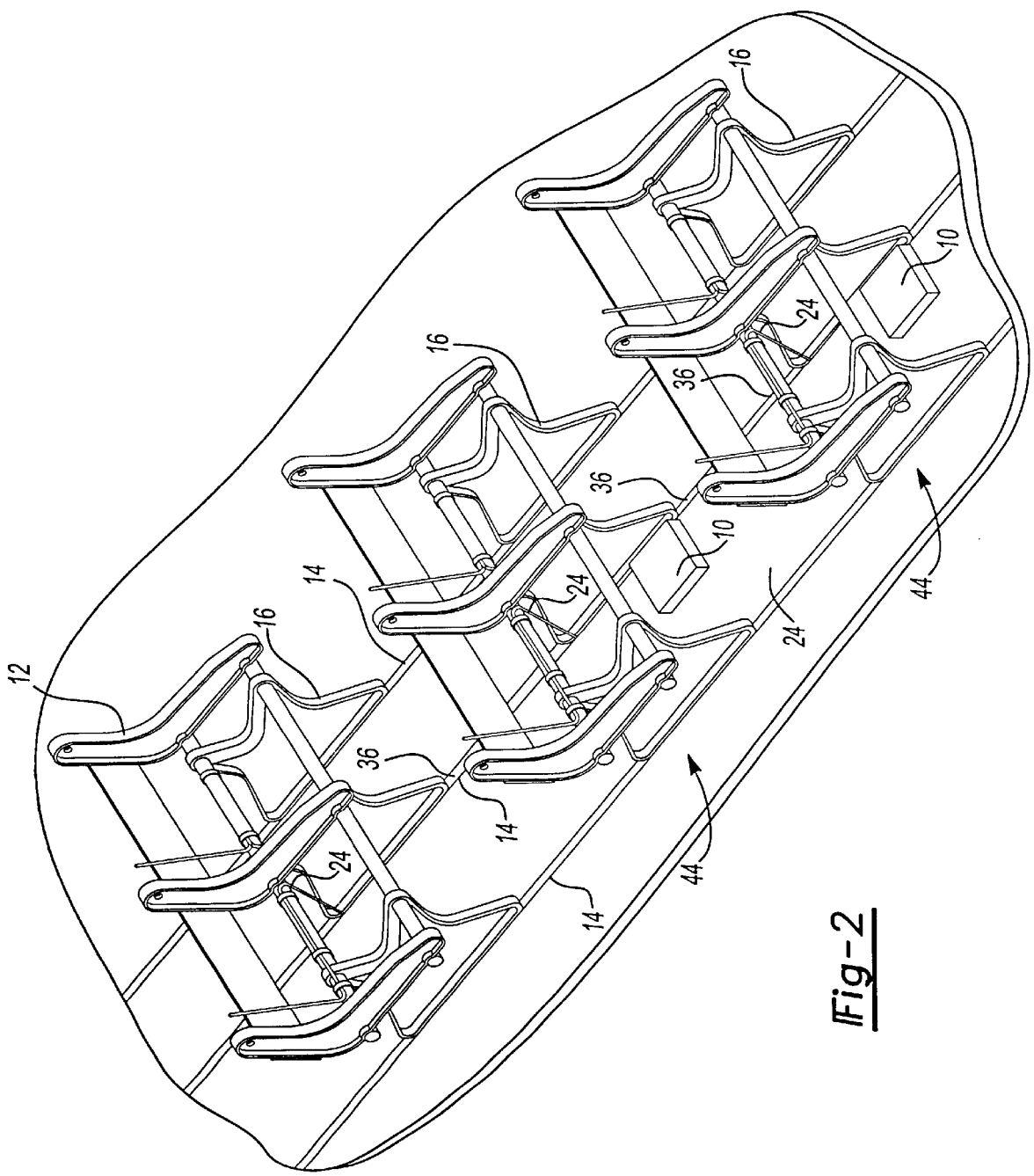
FIG. 2 is a perspective view of a passenger interface unit mounted to a floor of an aircraft according to the present invention.

Referring now to FIGS. 1 and 2, the present invention is shown and described. Referring now to FIG. 1, a passenger interface unit 10 is shown positioned under an aircraft seat 12. As will be described in greater detail, passenger interface unit 10 is secured to seat track 14 which also secures seat leg 16 of aircraft seat 12 to the floor area of an aircraft. As shown in FIG. 2, passenger interface unit 10 preferably is connected to the middle seat track 14 and extends traversely under each respective aircraft seat 12. However, it is noted that passenger interface unit 10 can extend from any seat track used to secure aircraft seats 12. In addition, passenger interface unit 10 can be positioned over seat track 14 or extending in any direction from seat track 14.

Figure 4:
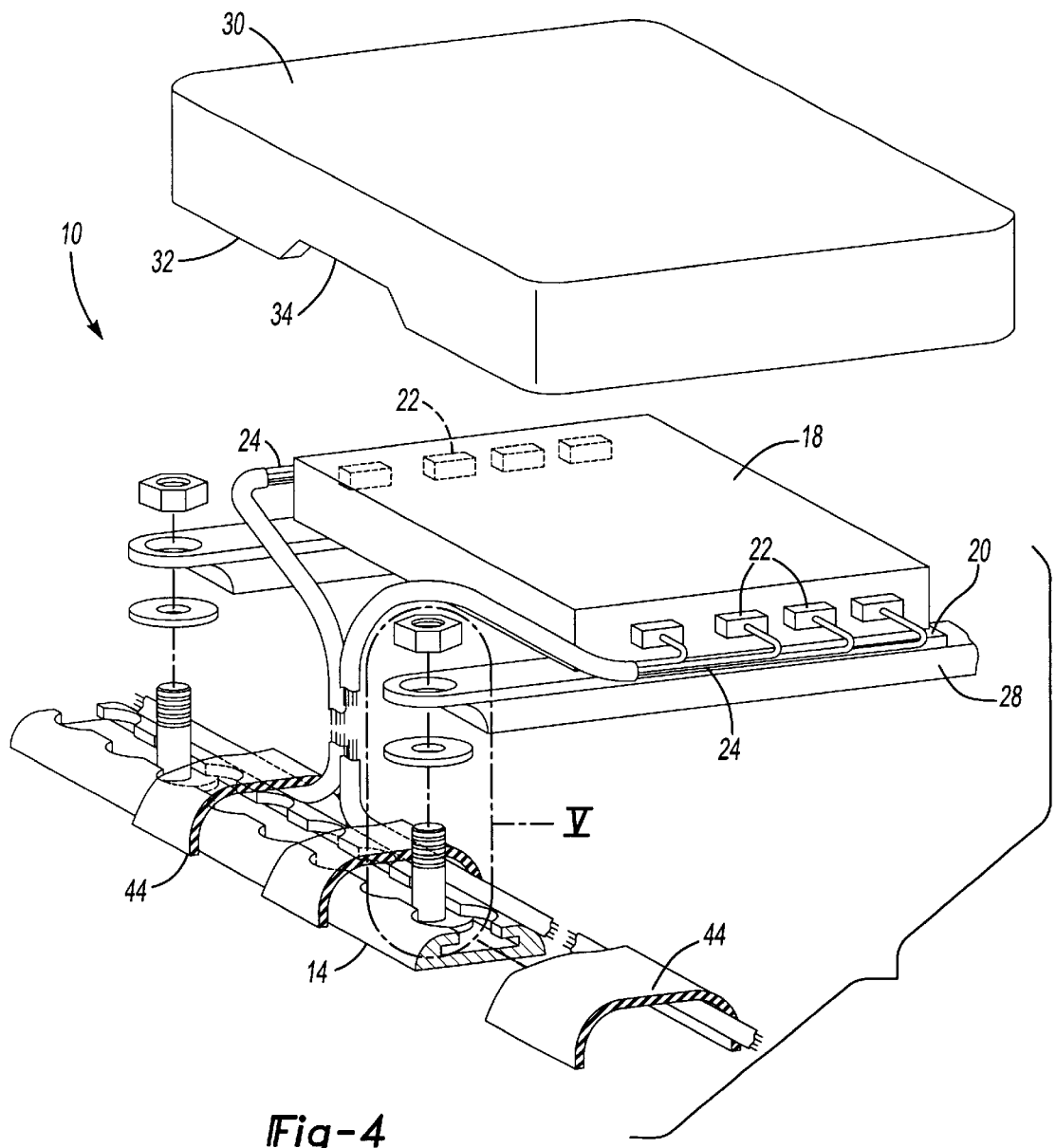
FIG. 4 is a perspective, exploded view of the mounting structure of a passenger interface unit according to the present invention.

As shown in FIG. 4, passenger interface unit 10 includes a server 18 mounted to a support plate 20. Server 18 is a computer server having a plurality of I.O. ports 22 for connecting cables 24 to respective aircraft seats 12 (as will be discussed). Server 18 is preferably rectangular and relatively flat in shape and mounts to support plate 20 by a plurality of fasteners such as bolts that are positioned through an outer casing of server 18 and through.,support plate 20. Support plate 20 is a generally rectangular and flat piece of material such as aluminum or plastic that has a pair of ears 26 disposed at corners along one side of support plate 20. Ears 26 have apertures for allowing a fastening means to pass therethrough to secure the passenger interface unit 10 to the seat track 14. The generally flat nature of server 18 and support plate 20 allow the passenger interface unit 10 to be easily positioned under the aircraft seat 12 without interfering with the feet of passenger sitting in the seat behind the passenger seat under which the passenger interface unit. 10 is located. Support plate 20 has raised edges 28 on opposite sides of support plate 20 for maintaining and guiding cables 24 from server 18 to seat track 14 as will be described in greater detail.

Cover 30 is rectangular in shape and has downward extending edges, 32 that pass around the outer perimeter of server 18 and abut support plate 20. Cover 30 is made of preferably plastic and protects server 18 from damage caused by feet of a passenger sitting behind the seat under which the server 18 is located. Cover 30 has a cut out section 34 that allows for a gap between cover 30 and support plate 20 when the cover 30 is attached to a support plate 20. Cut out section 34 allows a passage for cables 24 to pass from server 18 to seat track 14.

I.O. ports 22 are distributed length wise along opposite sides of the server 18. Preferably, four I.O. ports are disposed per side. It is noted that I.O. ports 22 can be serial, parallel, Ethernet or any other known type of ports for communicating between a personal computer and the server 18.

Figure 5:
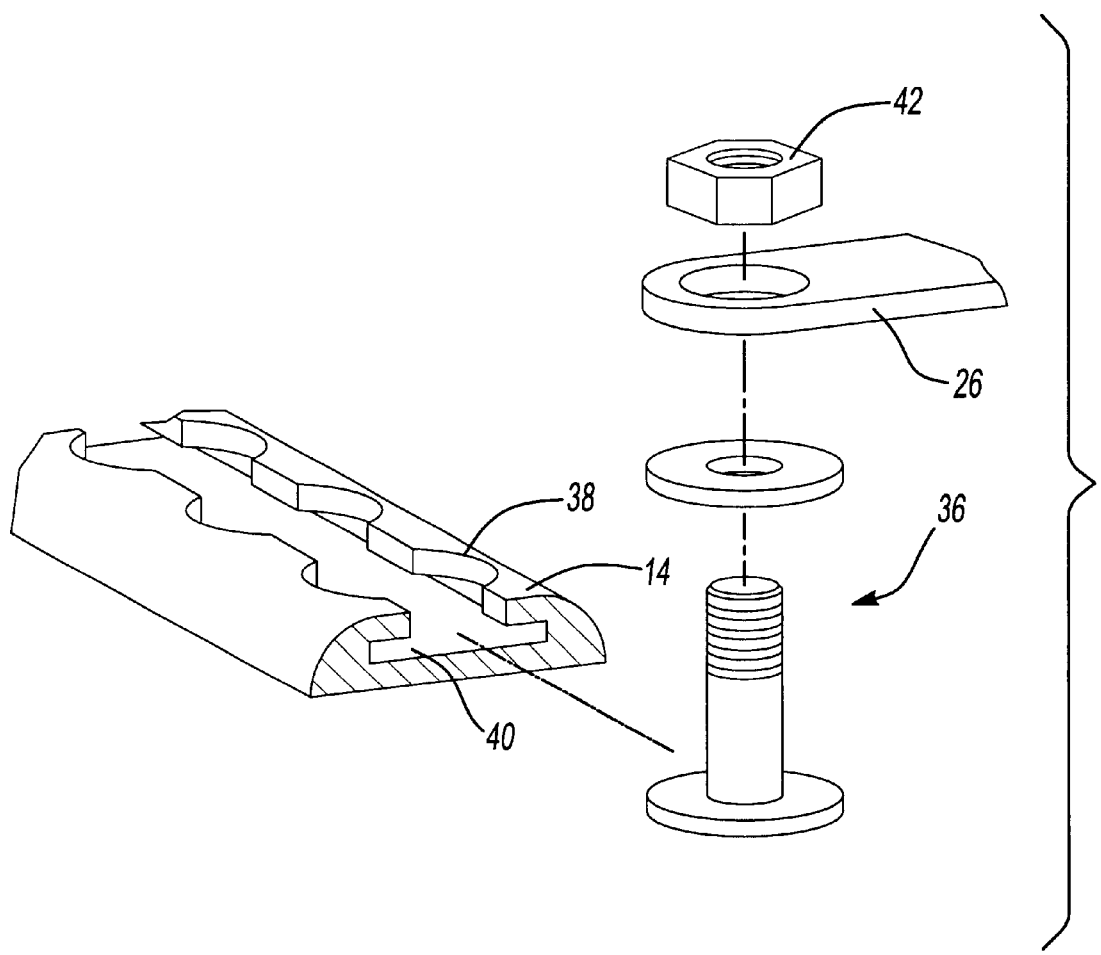
FIG. 5 is a perspective exploded view of V in FIG. 4 of the mounting structure for mounting a passenger interface unit to an aircraft according to the present invention.

Referring now to FIG. 5, a magnified view of V in FIG. 4 is shown in greater detail. In FIG. 5, the attachment of one of ears 26 to seat track 14 is described. In FIG. 5, a sliding bolt 36 is shown having a head 38 that sits on an under side of groove 40. As such, sliding bolt 36 is able to be slid along seat track 14 such that the positioning of sliding bolts 36 coincides with the most optimum location for passenger interface unit 10. Accordingly, once sliding bolts 36 are positioned at their respective predetermined locations, apertures in ears 26 are passed over the tops of bolts 36 until abutting seat track 14. Next, nut 42 is threaded to sliding bolt 36 to secure respective ears 26 to seat track 14. It is noted that ears 26 have a slight angle with respect to the remainder of support plate 20. This insures that after ears 26 are secure to seat track 14, support plate 20 and therefore passenger interface unit 10 are positioned against the carpeting and floor of the aircraft.

Figure 3:
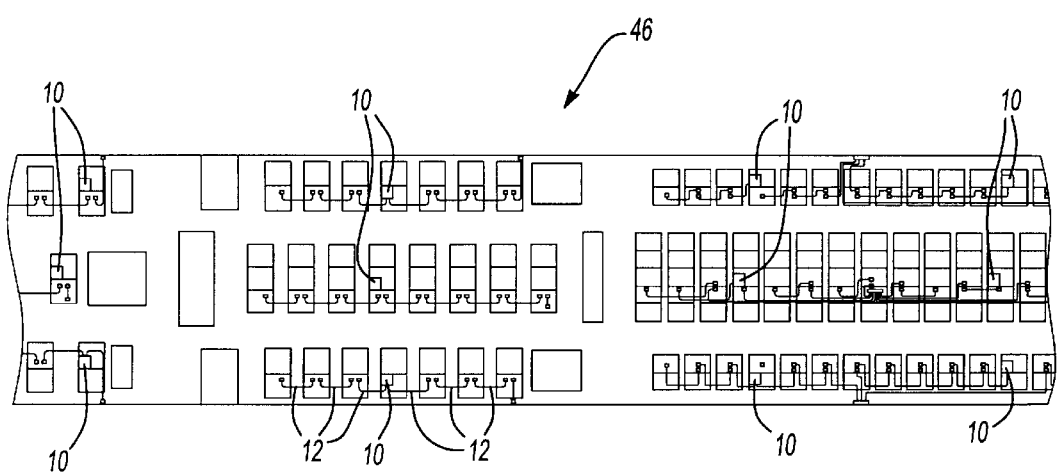
FIG. 3 is a plan view of a passenger interface unit mounted to a floor area of an aircraft according to the present invention.

Referring to FIG. 2 and FIG. 4, cables 24 extend from I.O. ports 22 and travel around the outer periphery of server 18 until exiting passenger interface unit through cut out section 34. Cables 24 then enter under seat track cover 44 and travel along seat track 14 between seat track cover 44 and seat track 14 until reaching respective aircraft seats 12. As shown in FIG. 2, at each respective aircraft seat 12, cables 24 extend from seat track 14 up and through the frame of each aircraft seat 12 until terminating at an output area in the seat. As such, as can be seen by reviewing FIG. 2 and FIG. 3, each passenger interface unit 10 can supply network communication to a plurality of aircraft seats 12 within an aircraft 46. Accordingly, by locating the passenger interface unit 10 above the floorboard of the aircraft 46 and by lockingly engaging the passenger interface unit to respective seat tracks 14, the passenger interface unit is able to supply a plurality of aircraft seats 12 with network communication.

As a result of the above described installation, a passenger interface unit can be repositioned throughout aircraft 14 when desired without requiring major construction or leaving aesthetically unpleasing holes in portions of the aircraft where the passenger interface unit previously resided. Moreover, as the previous location of passenger interface unit 10 does not have a residual hole or aperture, injury to passengers and damage to the aircraft due to passengers potentially stepping through residual holes in the floor board is alleviated.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A passenger interface unit for providing network connections to passengers inside an aircraft, the passenger interface unit comprising:
   a server;
   a connection means for connecting the server to a seat track in the aircraft;
   a support plate attached to one side of the server, the support plate having a pair of ears disposed at corners of the support plate, each of the ears having an aperture for passing a fastening means therethrough to attach the support plate to the seat track;
   cables connected to an outer surface of the server, the cables extending to a position adjacent to the seat track; and
   a seat track cover covering one side of the seat track, the cables extending between the seat track and the seat track cover.

2. A device for providing network connection to passengers in an aircraft, the device comprising:
   a passenger interface unit including a server;
   a seat track mounted to a floor portion of the aircraft, the passenger interface unit attached to the seat track;
   a support plate attached to a bottom surface of the server, the support plate abutting the floor portion of the aircraft, the support plate attached to the seat track, wherein the support plate is rectangular shaped and has a pair of ears, each of the pair of ears disposed on adjacent corners of the support plate, each of the pair of ears having an aperture disposed therethrough for passing a fastening device to attach to the seat track;
   a cover positioned around an outer surface of the server and attached to the support plate;
   cables connected to an outer surface of the server, the cables extending to a position adjacent to the seat track; and
   a seat track cover covering one side of the seat track, the cables extending between the seat track and a seat track cover.

3. The device as claimed in claim 2, further comprising:
   a plurality of the cables;
   a plurality of aircraft seats, each of the plurality of cables extending between the seat track and seat track cover and extending into a frame of a respective one of the aircraft seats.

4. An aircraft having a passenger interface unit for providing network connections to aircraft seats in the aircraft, the aircraft comprising:

a passenger interface unit;

a seat track, the passenger interface unit connected to the seat track;

a seat track cover disposed along one side of the seat track;

a plurality of cables extending from the passenger interface unit through an area between the seat track cover and the seat track;

a plurality of aircraft seats positioned on a floor portion of the aircraft, each of the plurality of cables terminating at a respective one of the aircraft seats.

5. The aircraft as claimed in claim 4, wherein the passenger interface unit further comprises a support plate attached to one side of a server, the support plate has a pair of ears with apertures respectively therethrough, a pair of fastening means, each of the pair of fastening means passing through a respective one of the pair of apertures and securing the support plate to the seat track.

6. The aircraft as claimed in claim 5, further comprising a cover disposed around an outer surface of the server, the cover attached to the support plate.

7. The aircraft as claimed in claim 4, further comprising a plurality of passenger interface units disposed on the floor portion of the aircraft.

8. A method for positioning a passenger interface unit inside an aircraft, the method comprising:

providing the passenger interface unit wherein the passenger interface unit comprises a server and a support plate;

placing the passenger interface unit on a floor portion of the aircraft adjacent to a seat track;

attaching the passenger interface unit to the seat track, the support plate being attached to one surface of the server, the support plate having a pair of ears disposed at adjacent corners of the support plate, each of the pair of ears having a respective aperture therethrough, wherein the passenger interface unit is attached to the seat track by positioning sliding bolts through each of the respective apertures and securing the ears to the sliding bolt;

connecting cables to an outer surface of the server, the cables extending to a position adjacent to the seat track; and covering one side of the seat track with a seat track cover for covering the cables extending between the seat track and the seat track cover, whereby the passenger interface unit is adapted to be attached to the seat track and easily moveable to a new seat track location.

* * * * *

UNITED STATES PATENT AND TRADEMARK OFFICE
CERTIFICATE OF CORRECTION

PATENT NO. : 6,619,588 B2
DATED : September 16, 2003
INVENTOR(S) : Guy Lambiaso

It is certified that error appears in the above-identified patent and that said Letters Patent is hereby corrected as shown below:

Column 1,
Line 9, remove "." after "to"
Line 38, remove "." after "link"
Line 54, remove "." after "The"

Column 2,
Line 11, remove "." after "seat"

Column 3,
Line 6, remove ".,"
Line 15, remove "." after "unit"
Line 22, remove "," after "edges"

Column 5,
Line 8, add -- and -- after "track"

Signed and Sealed this

Eleventh Day of November, 2003

JAMES E. ROGAN
*Director of the United States Patent and Trademark Office*